US008142853B2

(12) United States Patent
Roeder et al.

(10) Patent No.: US 8,142,853 B2
(45) Date of Patent: Mar. 27, 2012

(54) COVERING MATERIAL FOR BIOMASS, AND PROCESS FOR ITS PREPARATION

(75) Inventors: Olaf Roeder, Dresden (DE); Volker Kirchhoff, Wehlen (DE); Rainer Bartel, Dresden (DE); Wolfgang Schwarz, Dresden (DE); Edgar Remmele, Straubing (DE)

(73) Assignees: Fraunhofer-Gesellschaft zur Foerderung der Angewandten Forschung E.V., Munich (DE); Technologie-und Foerderzentrum, Straubing (DE)

( * ) Notice: Subject to any disclaimer, the term of this patent is extended or adjusted under 35 U.S.C. 154(b) by 758 days.

(21) Appl. No.: 12/295,205

(22) PCT Filed: Jan. 25, 2007

(86) PCT No.: PCT/EP2007/000610
§ 371 (c)(1),
(2), (4) Date: Sep. 29, 2008

(87) PCT Pub. No.: WO2007/112799
PCT Pub. Date: Oct. 11, 2007

(65) Prior Publication Data
US 2009/0169759 A1 Jul. 2, 2009

(30) Foreign Application Priority Data
Mar. 30, 2006 (DE) .................. 10 2006 014 862

(51) Int. Cl.
*B05D 1/00* (2006.01)
(52) U.S. Cl. .................. 427/372.2; 427/355; 427/356; 427/368; 427/371; 427/384; 427/421.1; 427/426; 427/427.4; 427/427.7
(58) Field of Classification Search .................. None
See application file for complete search history.

(56) References Cited

U.S. PATENT DOCUMENTS

| 2,345,255 A | * | 3/1944 | Gross | ........................ 106/38.51 |
| 2,719,802 A | | 10/1955 | Nottebohm | |
| 3,911,620 A | | 10/1975 | Glatti | |
| 5,048,228 A | | 9/1991 | Neven | |
| 6,258,870 B1 | * | 7/2001 | Hubbell et al. | ................. 522/26 |

FOREIGN PATENT DOCUMENTS

FR 2 633 803 1/1990
JP 02-245041 * 9/1990

* cited by examiner

*Primary Examiner* — Erma Cameron
(74) *Attorney, Agent, or Firm* — Greenblum & Bernstein, P.L.C.

(57) ABSTRACT

The invention relates to a covering material for biomass and a method for the production thereof, in which at least two components (A) and (B) are mixed and subsequently applied onto the biomass, wherein component (A) comprises an oil of animal or vegetable origin and an alginate and component (B) comprises an aqueous latex dispersion and/or a protein dissolved in water.

45 Claims, No Drawings

COVERING MATERIAL FOR BIOMASS, AND PROCESS FOR ITS PREPARATION

The invention relates to a covering material for biomass and a method for the production thereof, wherein the covering material comprises natural and renewable resources. Biomass hereby means all substances of organic origin, i.e., carbon-containing material, which are used as a renewable resource in energy recovery or material recovery, such as, e.g., in the recovery of biogas, the production of liquid energy sources (for example, biomass-to-liquid fuels) or in energy recovery through combustion, and are stored for this purpose.

Biogas is recovered in a controlled process in biogas plants. Virtually all organic substances can be decomposed by biochemical processes in these plants. Essentially methane is formed thereby, which is used as an energy source. Furthermore, carbon dioxide and water vapor as well as low amounts of nitrogen, hydrogen, oxygen and other gases are formed as by-products.

In addition to the water content of the biomass, the prerequisite for a successful formation of methane is the exclusion of atmospheric oxygen, since the individual biochemical processes run by means of anaerobic microorganisms. Due to the adaptability of these microorganisms to the process conditions, virtually all organic substances can be decomposed in biogas plants. To recover biogas, primarily the following are used: feces from livestock breeding, plant and animal waste, production waste such as fats, glycerin, etc. as well as renewable resources cultivated in a targeted manner such as, for example, corn, grain, millet, oleiferous fruits, beets and other grasses.

With the targeted production of renewable resources such as corn, grain, millet, oleiferous fruits, beets and other grasses for biogas recovery, which is being practiced to an increasing extent, after harvest the biomass must first be stored for stockpiling. Field storage facilities are generally used to this end. The recycling to form biogas takes place continuously over the entire year, so that the stored biomass is used up only gradually. The biochemical processes of hydrolysis, acidification and acetification already take place during storage. These initial phases are preliminary stages of the biogas generation and are also controlled by anaerobic bacteria. The admission of atmospheric oxygen into the storage facility must therefore already be excluded during the storage of the harvested crops.

PRIOR ART

Biomass storage facilities have hitherto been covered by means of films that are often arranged in several layers for effective sealing. Films of plastic such as, for example, polyethylene are used. Films of this type are sufficiently gas-tight at an appropriate thickness of at least 200 μm. They must withstand the temperatures of up to approx. 80° C. occurring during the biochemical reactions and through radiant exposure and thereby exhibit high strength values and elasticity values in order to withstand environmental effects. Furthermore, resistance to the acids produced during the biochemical decomposition through fermentation is necessary.

The requirements in particular regarding the exclusion of atmospheric oxygen are in part only inadequately met, since, for example, air pockets form between the covering film and biomass during the covering of the biomass due to irregularities in the surface, which air pockets inhibit the desired anaerobic biochemical processes or even partially totally exclude them.

Covering very large biomass depots causes considerable problems, since films are available only in limited widths. The admission of air cannot be ruled out in practice at the overlapping points of films. To cover a depot of, for example, 4,000 $m^2$ surface area, the mass of a film is already 800 kg to 1,000 kg. The application and spreading out of the films is therefore possible only by using large numbers of personnel and heavy technology. In addition, the films must be weighted down in order to prevent the uncovering and destruction of the field depots by acting winds. To this end, as a rule heavy sandbags of approx. 30 kg weight are used. Approx. 1,500-1,700 sandbags or other weighting objects, such as, for example, used tires with a total weight of approx. 50 t are necessary per 1,000 $m^2$ biomass depot. The trend is already for even larger biomass depots, which can in practice no longer be covered by conventional film systems using reasonable expenditure.

Another problem is the separation and disposal of the plastic films in the course of the recovery of the biomass. The biomass is successively removed beginning at one side of a depot and recovered in a biomass plant. Every day the covering must thereby be folded back over a width of the biomass of often more than 15 m and cut off. This work can be carried out only manually. The cutting surface often is more than 10 m in height and cannot be secured to protect workers from falling. Working on a biomass depot of this type is thus very laborious and dangerous. Furthermore, the recovery of the old film covering removed causes considerable problems, since the film is soiled by biomass adhering to it and therefore frequently has to be disposed of. Disposal of used covering film is therefore also associated with considerable expense.

Known covering systems for biomass depots consequently require a high expenditure in terms of personnel, finance and time for production of the covering, for handling the films and for weighting the films and for disposal and are therefore not satisfactory.

OBJECT

The invention is therefore based on the technical problem of creating a covering material for biomass and a method for the production thereof, wherein the covering material should be resistant to environmental effects and the biochemical decomposition products forming in the biomass, compared to known covering materials should enclose less air between the biomass and the covering material, must not be more expensive to produce, and requires as far as possible a lower expenditure in recovery and disposal.

This object is attained through a covering material for biomass, comprising a mixture of at least two components A and B, wherein component A comprises an oil of animal or vegetable origin and an alginate and component B comprises an aqueous latex dispersion and/or a protein dissolved in water, and a method for producing a covering material for biomass, in which at least two components A and B are mixed and subsequently applied to the biomass, wherein component A comprises an oil of animal or vegetable origin and an alginate and component B comprises an aqueous latex dispersion and/or a protein dissolved in water. Further advantageous embodiments of the invention are shown by the dependent claims.

A material and a method for the production thereof were developed with which preferably biomass depots can be covered simply and safely and protected against the admission of air and the action of environmental effects.

Alginate-based materials are known as impression materials from the dental field. After being mixed with water they form elastic materials that are insoluble in water after reaction has taken place. Dental alginates (U.S. Pat. No. 2,345,255) have been used for a long time, also with the use of additives to prevent a formation of particulates that can occur when the powder is stirred. Materials of this type are suitable as dental impression masses. However, they cannot be used for the tasks according to the invention, since they remain dimensionally stable and elastic only for a few days when stored in air. Dental alginates do not bind water in a chemically stable manner, so that after a short time the water escapes through evaporation. A marked embrittlement and shrinkage of the material due to water evaporation starts after storage of the dental alginates for several days and makes it unusable in this form for attaining the object.

It was found that conventional dental alginate mixtures based on their mass can absorb and bind approx. 60-80% of a vegetable oil such as, e.g., linseed oil or rapeseed oil. After gelling, at first no oil escapes and the mass has good elastic properties. With progressive evaporation of the water, a moderate shrinkage of the oil-filled alginate material as well as embrittlement occurs. A part of the bound oil oozes out and forms a film on the surface of the material.

A covering material according to the invention is therefore obtained in that at least two separately storable components A and B are mixed with one another. The main constituents of the components come from primarily natural and renewable resources and for the most part can be recovered themselves in biogas plants. The main constituents of component A are oil of animal or vegetable origin, preferably of natural and renewable resources, such as, for example, linseed oil, rapeseed oil, sunflower oil, soy oil, palm oil, palm kernel oil, coconut oil, camelina oil and/or corn oil, and as a carrying agent a reticulating agent (alginate) that is obtained from algae. For example, sodium alginate or potassium alginate can be used as an alginate. Component B comprises a network-supporting emulsifier. For example, an aqueous latex dispersion is suitable as an emulsifier. The term aqueous latex dispersion hereby means an aqueous dispersion of hydrocarbon polymers, which on the one hand exist in nature as renewable resources, for example, as natural latex or natural rubber, and are recovered from trees or other plants, or on the other hand are produced synthetically and have similar properties to natural latex/natural rubber.

However, there is also the possibility of using a vegetable or animal protein or protein isolate (for example, soy protein) dissolved in water or a mixture of protein/protein isolate dissolved in water and a latex dispersion as network-supporting emulsifier.

Auxiliary materials and fillers, preservatives, regulators for adjusting the reaction time, and water can also optionally be added to the components A and/or B or the mixture of the two components. The flowable components A and B can be separately stored, transported and individually conveyed and mixed with the aid of conventional mixing techniques.

After the mixing of components A and B by hand or, for example, in an industrial mixer, the material is initially present in a flowable form. The viscosity and the flow characteristics can be adjusted by the selection of the fillers and variation of the amounts of the components.

In the mixture of the components A and B in a first step the alginate reacts with the water and forms a network $N_1$, wherein water, oil and, if present, also fillers are incorporated into the network $N_1$. At the same time, through the extraction of water the emulsifier forms a network $N_2$ that closely interlocks with the network $N_1$, wherein the total network structure $N_1+N_2$ binds all of the components present in the mixture in their entirety such that a material suitable for applications according to the invention is formed.

Advantageously chalk and/or diatomaceous earth are used as fillers, since they (presumably due to their surface structure) support the interlocking of the network structures $N_1$ and $N_2$. However, other substances can also be used as fillers, in particular biologically degradable substances, such as starch, modified starch, sugar, cellulose as fiber or in cubic structure, which, for example, are obtained from wood or other plants.

Through the addition of accelerators or retarders, the reaction time of the material can be adjusted within wide limits from a few minutes to several hours. During this time, also called pot life, the application of the material, for example, by spraying, pouring, spreading, doctoring, smoothing or similar methods onto the biomass to be covered is possible. The optimum pot life for the respective application technique is adjusted by the selection of the amounts of accelerators or retarders.

Sodium phosphate and/or calcium sulfate, for example, can be added to the component A as retarders of the reaction time. Furthermore, retarders can be added to component B in the form of, for example, potassium hydroxide, sodium hydroxide or ammonia. Additions of acids to component B such as, for example, acetic acid, citric acid, propionic acid, etc., however, act as accelerators of the crosslinking process.

The material according to the invention is characterized after setting in that under the required conditions of the covering of biomass depots it is durable, but is largely degraded after being introduced into a biogas plant. This is because the alginate network $N_1$ is durable and water-insoluble in the alkaline, neutral and even up to slightly acid pH range. In the very acid range, however, alginic acid is precipitated, through which the alginate network disintegrates. Furthermore, the network structure $N_2$ is embodied through coagulation of the emulsifier and not crosslinked through sulfur bridge bonds and can therefore likewise be biologically degraded. Natural emulsifiers such as, for example, proteins are excellently biologically degradable.

In a preferred embodiment, the covering material is embodied as a foam using at least one further ingredient.

One variant for foam formation lies in integrating a propellant such as, for example, a hydrogen carbonate (for example, sodium hydrogen carbonate or ammonium hydrogen carbonate) into component A, which propellant cleaves a propellant gas through a chemical reaction. The reaction of the propellant gas cleavage is triggered by the addition of an acid reactant to the material mixture. In the case of the use of a hydrogen carbonate as a gas-forming substance, for example, citric acid or propionic acid serves as a reactant. To form a foam, the two separately storable components A and B are first mixed in the manner described. The addition of the reactant does not take place until the process of application as a fabric. However, it is also possible to mix components A and B and the reactant jointly during the process of application as a fabric.

The mixed components react in the described manner, wherein the acid reactant triggers a reaction running parallel with the formation of the total network structure $N_1+N_2$ in that on the one hand the chemical reaction of the propellant gas formation takes place through a release of, for example, $CO_2$, in the case of the use of a hydrogen carbonate, and leads to a volume increase of the material and parallel thereto the pH of the material mixture changes from the alkaline to the acid condition, through which the formation of the emulsifier network $N_2$ runs in an accelerated manner. In this manner a foaming of the material and a simultaneously rapid fixing and solidification is achieved.

In a second variant of the material foaming, a base metal such as, for example, magnesium, iron, aluminum and/or zinc that is dispersed in component A in powder form is used as a gas-forming substance. A particular suitability for foaming the material according to the invention was found for aluminum powder that acts as a propellant in particular in the present alkaline condition. The presence of hydroxide ions, for example, through the use of potassium hydroxide and/or sodium hydroxide, has a promoting effect. After the mixing of components A and B, through the reaction of the aluminum with water the cleavage of hydrogen occurs, which acts as a propellant gas. I.e., water from the aqueous latex dispersion or water that is additionally added to the mixture acts as a reactant of the gas-forming metal powder. The reaction thereby runs weakly to powerfully, wherein the reaction speed can be controlled through the pH, in particular, for example, through the concentration of the sodium hydroxide and/or potassium hydroxide and through the temperature of the mixture.

In a further advantageous embodiment variant of the method for producing a fabric of covering material, the mixing and application are carried out with the aid of multi-component spray systems such as, for example, multi-component spray guns. The components A and B are individually fed to the multi-component spray system under pressure, mixed in the mixing chamber integrated there, and applied to the surface of the biomass as a directed spray optionally using, for example, compressed air. Due to the reaction time of the components and the high particle speed during spraying, the reaction of the material does not occur until after striking the surface.

In the embodiment of the material as a foam, the gas formation likewise does not occur until after the application onto the surface. In a first phase after the mixing and leaving the multi-component spray system, the sprayed material strikes the surface of the biomass particles and wets them, whereupon the second phase of the foaming and as third phase the solidification of the material takes place chronologically thereafter. During the second phase, the volume increase of the material occurs through propellant gas development of the propellant, through which the inclusion of protruding fibers and particles of the biomass is achieved and in the course of the further expansion of the covering material the closing of the material film to form a homogenous, continuous fabric occurs. After conclusion of the third phase, the solidification of the material, the material according to the invention is present as a closed-pore foamed air-tight and weather-proof fabric. The included fibers and particles of the biomass cause an interlocking with the total mass lying beneath, through which the fabric is firmly anchored and is stable against the influence of acting wind even without additional weighting. Due to good adhesive properties of the material, a close connection of the fabric to the base and walls and an additional mechanical anchoring is achieved. Furthermore, through the foaming the necessary material quantity is reduced, wherein the thermal insulation is additionally improved.

The invention is explained in more detail below based on a preferred exemplary embodiment without restricting the scope of the invention to the material composition given thereby.

The assembly of components A and B takes place in a first step. As component A the following are mixed: linseed oil and sodium alginate, to which chalk and diatomaceous earth as filler and sodium phosphate and calcium sulfate as retarders are added. Component B comprises a mixture of a 60% natural latex dispersion to which water, potassium hydroxide as retarder and zinc oxide as preservative are added. The exact mass proportions are given in Table 1.

TABLE 1

| Component | Constituent | Mass proportion in % |
|---|---|---|
| A | Linseed oil | 27.0 |
| | Sodium alginate | 1.6 |
| | Chalk | 5.8 |
| | Diatomaceous earth | 5.8 |
| | Sodium phosphate | 0.3 |
| | Calcium sulfate | 1.0 |
| B | Natural latex dispersion, 60% NR | 22.4 |
| | Water | 35.0 |
| | Potassium hydroxide | 0.2 |
| | Zinc oxide | 0.9 |

Components A and B are mixed with one another directly before the application of the material onto biomass. The formation of network structures and of a contact-stable material take approx. 2 hours after the mixing of the two components. After another 22 hours the material is completely hardened. Then a covering material for biomass is available which protects the biomass from atmospheric oxygen and environmental effects, is resistant to biochemical decomposition products of the biomass, does not require any additional fastening aids and can be easily carried away with the biomass and recovered in a biogas plant.

Table 1 illustrates by way of example an exact mixing ratio for constituents of a biomass covering material. Based on the exemplary embodiment shown in Table 1, Table 2 shows advantageous mass proportion ranges of the material constituents, within which depending on the application, the properties of the covering material (for example, with regards to the retardation of the formation of the network structures, consistency of the covering material and hardening time) can be adjusted.

TABLE 2

| Component | Constituent | Mass proportion in % |
|---|---|---|
| A | Linseed oil | 5-80 |
| | Sodium alginate | 0.5-10 |
| | Chalk | 0-30 |
| | Diatomaceous earth | 0-30 |
| | Sodium phosphate | 0.05-5 |
| | Calcium sulfate | 0-5 |
| B | Natural latex dispersion, 60% NR | 10-50 |
| | Water | 0-50 |
| | Potassium hydroxide | 0.05-5 |
| | Zinc oxide | 0.05-5 |

The invention claimed is:

1. Covering material for biomass, comprising a mixture of at least two components A and B, wherein component A comprises an oil of animal or vegetable origin and an alginate and component B comprises an aqueous latex dispersion and/or a protein dissolved in water.

2. Covering material according to claim 1, characterized in that the vegetable oil is linseed oil, rapeseed oil, sunflower oil, soy oil, palm oil, palm kernel oil, coconut oil, camelina oil and/or corn oil.

3. Covering material according to claim 1, characterized in that the alginate is sodium alginate and/or potassium alginate.

4. Covering material according to claim 1, characterized in that component A comprises a filler.

5. Covering material according to claim 4, characterized in that the filler is chalk, diatomaceous earth, starch, sugar and/or cellulose.

6. Covering material according to claim 1, characterized in that component A comprises a retarder.

7. Covering material according to claim 6, characterized in that the retarder is sodium phosphate and/or calcium sulfate.

8. Covering material according to claim 1, characterized in that component A comprises a propellant.

9. Covering material according to claim 8, characterized in that the propellant is sodium hydrogen carbonate and/or ammonium hydrogen carbonate.

10. Covering material according to claim 8, characterized in that the propellant is a powder of a base metal.

11. Covering material according to claim 10, wherein the base metal comprises at least one of magnesium, iron, aluminum and zinc.

12. Covering material according to claim 9, characterized in that the covering material comprises an acid as reactant.

13. Covering material according to claim 12, characterized in that the reactant is citric acid, acetic acid and/or propionic acid.

14. Covering material according to claim 1, characterized in that the aqueous latex dispersion is a dispersion of natural and/or synthetic latex.

15. Covering material according to claim 1, characterized in that component B comprises a retarder.

16. Covering material according to claim 15, characterized in that the retarder is potassium hydroxide, sodium hydroxide and/or ammonia.

17. Covering material according to claim 1, characterized in that the component B comprises an accelerator.

18. Covering material according to claim 17, characterized in that the accelerator is acetic acid, propionic acid and/or citric acid.

19. Covering material according to claim 1, characterized in that it comprises a preservative.

20. Covering material according to claim 19, characterized in that the preservative is zinc oxide.

21. Covering material according to claim 1, characterized in that it is embodied as a foam.

22. Method for producing a covering material for biomass, in which at least two components A and B are mixed and subsequently applied to the biomass, wherein component A comprises an oil of animal or vegetable origin and an alginate and component B comprises an aqueous latex dispersion and/or a protein dissolved in water.

23. Method according to claim 22, characterized in that linseed oil, rapeseed oil, sunflower oil, soy oil, palm oil, palm kernel oil, coconut oil, camelina oil and/or corn oil are used as vegetable oil.

24. Method according to claim 22, characterized in that sodium alginate and/or potassium alginate are used as an alginate.

25. Method according to claim 22, characterized in that a filler is added to component A.

26. Method according to claim 25, characterized in that chalk, diatomaceous earth, starch, sugar and/or cellulose are used as a filler.

27. Method according to claim 22, characterized in that a retarder is added to component A.

28. Method according to claim 27, characterized in that sodium phosphate and/or calcium sulfate are used as a retarder.

29. Method according to claim 22, characterized in that a propellant is added to component A.

30. Method according to claim 29, characterized in that sodium hydrogen carbonate and/or ammonium hydrogen carbonate are used as a propellant.

31. Method according to claim 29, characterized in that a powder of a base metal is used as a propellant.

32. Method according to claim 31, wherein the base metal comprises at least one of magnesium, iron, aluminum and zinc.

33. Method according to claim 30, characterized in that an acid is added as a reactant.

34. Method according to claim 33, characterized in that citric acid, acetic acid, and/or propionic acid are used as a reactant.

35. Method according to claim 22, characterized in that a dispersion of natural and/or synthetic latex is used as an aqueous latex dispersion.

36. Method according to claim 22, characterized in that a retarder is added to component B.

37. Method according to claim 36, characterized in that potassium hydroxide, sodium hydroxide and/or ammonia is used as a retarder.

38. Method according to claim 22, characterized in that an accelerator is added to component B.

39. Method according to claim 38, characterized in that acetic acid, propionic acid and/or citric acid are used as an accelerator.

40. Method according to claim 22, characterized in that a preservative is added.

41. Method according to claim 40, characterized in that zinc oxide is used as a preservative.

42. Method according to claim 22, characterized in that the material is applied to the biomass by spraying, pouring, spreading, doctoring or smoothing.

43. Method according to claim 22, characterized in that the mixing of components A and B and the application of the material onto the biomass is carried out by means of a multi-component spray system.

44. Method according to claim 43, characterized in that the application of the material onto the biomass is carried out by means of compressed air.

45. Method according to claim 22, characterized in that components A and B are mixed to form a flowable mass or a foam.

* * * * *